(12) United States Patent
Andrepont

(10) Patent No.: US 6,408,609 B1
(45) Date of Patent: Jun. 25, 2002

(54) METHOD AND APPARATUS FOR ENHANCING POWER OUTPUT AND EFFICIENCY OF COMBUSTION TURBINES

(75) Inventor: John S. Andrepont, Naperville, IL (US)

(73) Assignee: Chicago Bridge & Iron Company, Plainfield, IL (US)

( * ) Notice: Subject to any disclaimer, the term of this patent is extended or adjusted under 35 U.S.C. 154(b) by 0 days.

(21) Appl. No.: 09/591,250

(22) Filed: Jun. 9, 2000

(51) Int. Cl.[7] .............................................. F02C 7/143
(52) U.S. Cl. ........................................ 60/39.02; 60/728
(58) Field of Search ............................. 60/39.02, 39.53, 60/728

(56) References Cited

U.S. PATENT DOCUMENTS

| | | | | |
|---|---|---|---|---|
| 2,322,717 A | * | 6/1943 | Nettel ........................... | 60/728 |
| 5,444,971 A | * | 8/1995 | Holemburger ................ | 60/728 |
| 5,655,377 A | | 8/1997 | Mornhed et al. .............. | 62/59 |

OTHER PUBLICATIONS

Chicago Bridge & Iron Company, "CBI POWER–THERM™ Combustion Turbine Inlet Air Cooling Systems", 1994.
John S. Andrepont, "Performance and Economics of Combustion Turbine (CT) Inlet Air Cooling Using Chilled Water Storage", ASHRAE Transactions 1994, vol. 100, Part 1.
J. Kevin Cross et al., "Modeling of Hybrid Combustion Turbine Inlet Air Cooling Systems" ASHRAE Transactions 1995, vol. 101, Part 2.

* cited by examiner

*Primary Examiner*—Louis J. Casaregola
(74) *Attorney, Agent, or Firm*—Marshall, Gerstein & Borun

(57) ABSTRACT

Output power and efficiency of combustion turbines, in particular, and combustion engines, in general, are improved by providing cooled intake air to the combustion device. The cooled air is obtained using a thermal energy storage system that has a stratified chilled fluid storage tank. A local or remote chiller plant, possibly already present for use in a thermal energy distribution system, provides the chilled fluid, which can be an aqueous solution of sodium chloride or calcium chloride or both, during off-peak operating times.

8 Claims, 2 Drawing Sheets

METHOD AND APPARATUS FOR ENHANCING POWER OUTPUT AND EFFICIENCY OF COMBUSTION TURBINES

BACKGROUND OF THE INVENTION

1. Field of the Invention

This invention relates generally to improving output and efficiency of combustion engines and, more particularly, to cooling inlet air to combustion turbines.

2. Description of the Background

Internal combustion engines, including gas turbine engines, also known as combustion turbines, are means of converting fuel such as natural gas, oil, or other liquid or gaseous fuels to electrical, mechanical and/or other forms of useful power output. The available power output of internal combustion engines, however, typically diminishes with rising inlet air temperature. Typical combustion turbines, whose power output is defined as 100% at 15 C. (59° F.) are derated to approximately 85% power output at inlet air temperatures of 90 to 100° F. Conversely, cooling in the inlet air to 40 to 50° F. results in an increased rating of approximately 105% power output. Accordingly, it is of interest, and has been put into practice, to cool the inlet air to combustion turbines, during times of hot ambient air temperatures, to increase the power output. In particular, inlet air cooling is advantageous during periods when ambient air temperatures are high and concurrently the demand for, and the value of, power output is high.

Among the several methods that have been traditionally used for combustion inlet air cooling are the following, each with inherent limitations, as noted.

Although quite low in unit capital cost, that is, capital cost per unit of incremental power output, evaporative cooling can only cool the air to a temperature near the ambient wet bulb temperature. Therefore, this method has quite limited value in terms of power output enhancement, especially on hot, humid days when it is most needed.

Absorption cooling is able to be powered by heat recovered from the combustion turbine exhaust, however, this method has relatively high unit capital cost and some limitations on how low a temperature can be achieved, for example approximately upper 40s to 50° F. air, due to absorption chiller operation in the lower 40s.

Although mechanical refrigeration has no temperature limitations, it has relatively high unit capital cost and consumes roughly one third of the incremental combustion turbine output in parasitic power consumption when operating to produce 40 to 50° F. inlet air.

Chilled water thermal energy storage offsets the parasitic power losses of mechanical refrigeration to off-peak periods, when energy value is low. Also, it cuts unit capital cost dramatically. It has, however, a temperature limit for cooling the air, which is not lower than middle to upper 40s ° F., due to the temperature limit of chilled water storage that is set by the point of maximum water density, 4.1 C. or 39.4° F. Also, the storage tank volume requirements are large.

Although ice thermal energy storage can achieve lower air temperatures, for example upper 30s to 40° F., it is more complex and costly than is chilled water storage. Ice thermal energy storage can achieve greater combustion turbine output enhancement, but the incremental output versus chilled water thermal energy storage is at a very high capital cost. Installations typically employ weekly-cycle ice harvester technology, resulting in storage tanks that are as large as the daily cycle chilled water storage tanks.

Thus, it would be desirable to achieve a means of cooling combustion turbine inlet air to a temperature level as cold, or colder than, is practical when using ice thermal energy storage, yet with the simplicity and low unit cost associated with the conventional chilled water thermal energy storage. Also, it would be desirable to achieve a means of reducing the excessive storage volume requirement associated with the conventional chilled water and ice thermal energy storage systems.

OBJECTS AND SUMMARY OF THE INVENTION

Accordingly, it is an object of the present invention to provide a method and an apparatus for improving and enhancing the power output and efficiency of combustion turbine engines that can eliminate the above-noted defects inherent in the prior art.

Another object of this invention is to provide an improved method and apparatus for cooling inlet air to a combustion turbine by using chilled fluid thermal energy storage.

It is a further object of this invention to provide cooled inlet air to a combustion turbine using chilled fluid thermal energy storage in which the chilled fluid is an aqueous solution of a salt, such as sodium chloride an calcium chloride.

According to one aspect of the present invention, an improved system and method for cooling the inlet air of a combustion turbine or other internal combustion engines is provided, in which thermal energy storage system is employed using undersized chillers that is, smaller than the peak inlet air cooling load, which operate during relatively lengthy off-peak periods to charge a stratified thermal energy storage system that is in turn discharged and used to cool the inlet air during relative brief peak periods. The present invention is an improvement over other combustion turbine inlet air cooling systems in that it employs a thermally stratified system, but not one storing essentially pure water as is the case with conventional chilled water thermal energy storage systems. Thus, the inherent 4.1 C. (39.4° F.) temperature limit is avoided by the present invention, through the use of a thermally stratified storage fluid with characteristics appropriate to lower temperature stratification.

Cooling can be accomplished in charging and discharging storage at temperatures low enough to produce combustion turbine inlet air as cold as, or even colder than, those available from ice thermal energy storage systems, thus maximizing combustion turbine power output enhancement. More importantly the present invention does so while preserving the relative simplicity of design and operation and the low unit capital cost associated with the conventional chilled water thermal energy storage, while avoiding the relative complexity, inefficiency, and higher unit capital cost of ice thermal energy storage systems.

Also, the lower supply temperature in storage results in a larger temperature differential within storage and, thus, in a smaller less expensive storage volume requirement. In fact, the storage volume will typically be significantly reduced from that required by either the conventional chilled water thermal energy storage approach or the weekly ice thermal storage approach.

DETAILED DESCRIPTION OF PREFFERRED EMBODIMENTS

Figure 1:
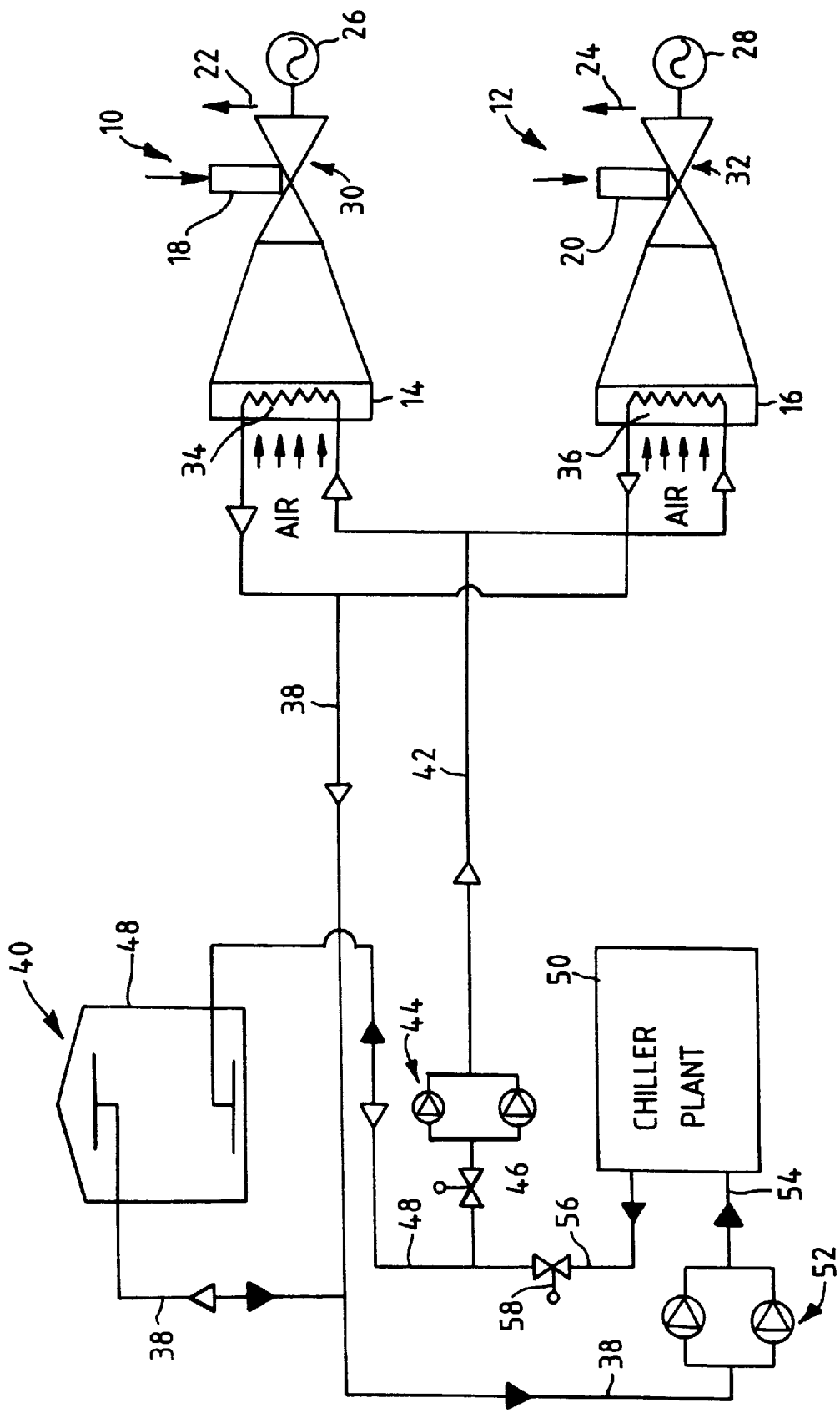
FIG. 1. is a system diagram of an embodiment of the present invention showing a combustion turbine and a stratified chilled fluid thermal energy storage tank.

In the embodiment of the present invention shown in FIG. 1, two combustion turbine assemblies 10 and 12 are shown, each respectively including an inlet air cooler 14, 16, a fuel inlet 18, 20, an exhaust 22, 24, and each being mechanically connected to an electrical generator 26, 28. The turbines themselves are shown generally at 30, 32.

Each air cooler 14, 16, operates as a heat exchanger and employs a respective coil or the like 34, 36 that is connected to a source of cooled fluid. More specifically, the outlets of coils 34, 36 are connected through fluid line 38 to a stratified chilled fluid storage tank, shown generally at 40, and the fluid inlets to the coils 34, 36 are connected to the stratified chilled fluid storage tank 40 via fluid line 42. In the schematic diagram of FIG. 1, solid arrowheads represent a fluid flow direction during off-peak operation times and an open arrowhead represents the fluid flow direction during on-peak operation times. The cooling coil inlet line 42 is connected to the stratified chilled fluid storage tank 40 that provides the thermal energy storage by a pair of chilled fluid pumps 44, a valve 46, and fluid line 48.

Thus, briefly stated, chilled fluid that has been previously stored in the stratified chilled fluid storage tank 40 is fed via valve 46 and the pumps 44 to the cooling coils 34, 36 via line 42 and the warmed fluid after having passed through the inlet air cooling coils 34, 36 is returned to the stratified chilled fluid storage tank 40 through fluid line 38.

The warmed fluid in fluid line 38 is also returned for recooling to the original source of the cooled fluid, which is a chiller plant 50 of a known kind, through a pair of warm-fluid pumps 52 and fluid line 54. The output of the chiller plant 50 is fed through fluid line 56 and valve 58 to line 48 and, hence, to the stratified chilled fluid tank 40 where the thermal energy is stored. At that time, valve 46 is closed so that the chilled fluid flows into tank 40 for storage.

As noted above, the solid arrowheads represent fluid flow during off-peak times. Thus, during off-peak times chilled fluid can be stored in the thermal energy storage tank 40. On the other hand, during peak operation times, as represented by the solid arrowheads, the chilled fluid flows from the tank 40 and is pumped by pumps 44 through the coils 34, 36 and thence back to the storage tank 40.

Figure 2:
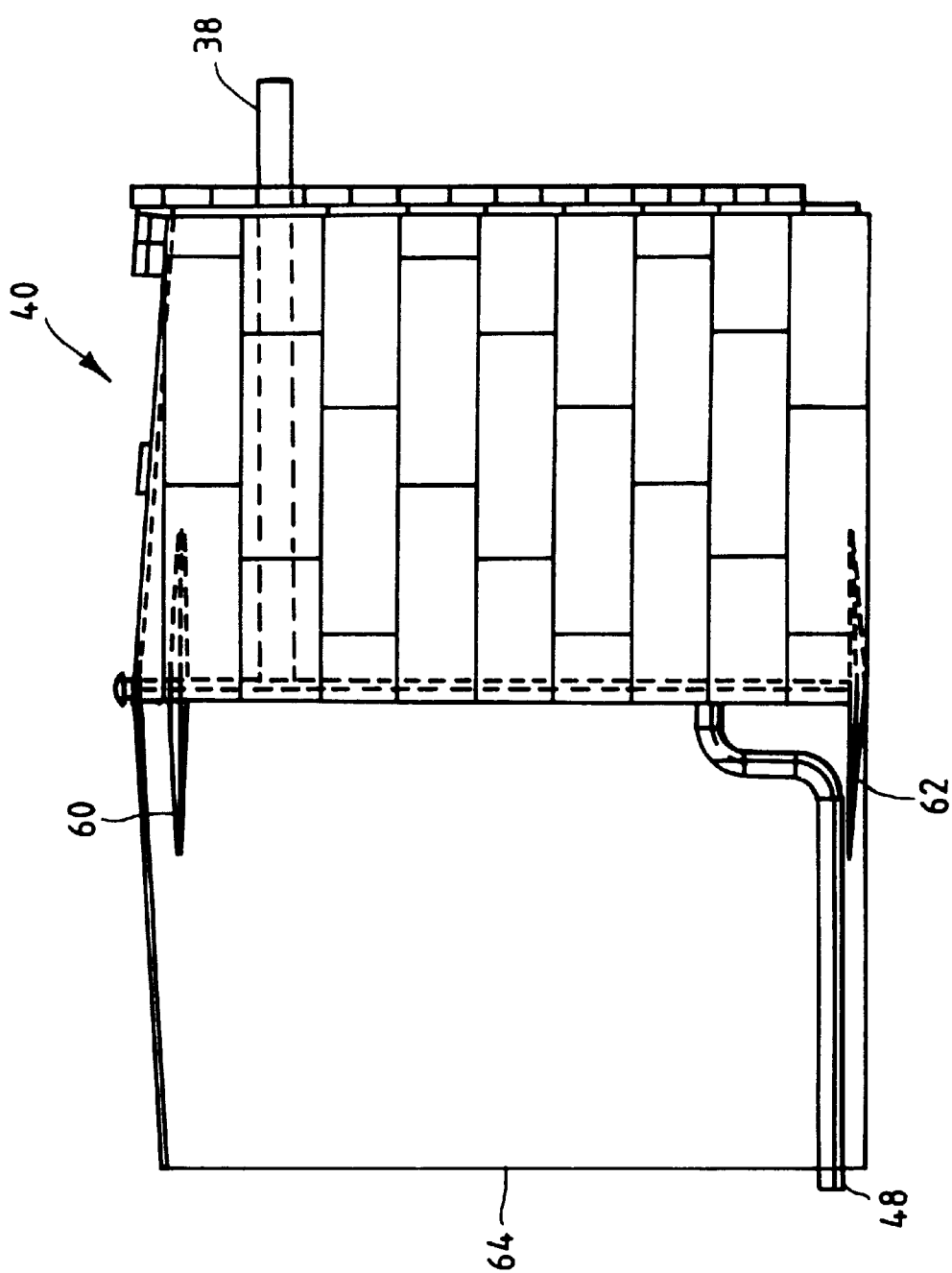
FIG. 2. is an elevational view in partial cross section of the stratified chilled fluid thermal energy storage tank used in the system of FIG. 1.

The stratified chilled fluid storage tank 40 is represented in FIG. 2 and is of the kind generally described in U.S. Pat. Nos. 5,465,585, and 5,655,377 assigned to the assignee hereof and whose disclosures are incorporated herein by reference. Such a storage tank 40 can be quite large, on the order of 127 feet in diameter and 90 feet high. A feature of this kind of thermal energy storage system is the stratification of the fluid into layers of different respective temperatures. This is accomplished by using radial diffuser plates, represented by a plate 60 at the top and a plate 62 at the bottom of the tank 64. A pipe diffuser system, not shown, is alternativley used to prevent mixing of the fluids of different temperatures.

Although the system described in U.S. Pat. Nos. 5,465, 585 5,655,377 discloses adding sodium nitrite and sodium nitrate, the present invention may alternatively employ other fluids. More specifically, the present invention can employ an aqueous solution containing: sodium chloride, calcium chloride, both sodium chloride and calcium chloride, potassium acetate, potassium formate, potassium nitrite, ethyleneglycol or propylene glycol. Also, a solution of aqueous ammonia or anhydrous ammonia could be employed. Lastly, either natural or synthetic seawater could be used as the fluid in the system of the present invention. In the above formulations, a 5–7 weight percent aqueous solution has been found to provide advantageous results.

I claim:

1. A method for increasing power output of a combustion turbine, comprising the steps of:

providing a combustion turbine, a storage tank, and a separate refrigeration unit;

storing a fluid other than plain water in the storage tank, in thermally stratified storage;

periodically refrigerating portions of the fluid in the refrigeration unit and providing the refrigerated fluid to the storage tank at a temperature below 4.1° C. (39.4° F.); and directing portions of the stored fluid to a cooler associated with the combustion turbine.

2. The method according to claim 1 in which the fluid is an aqueous solution containing sodium nitrite.

3. The method according to claim 1 in which the fluid is an aqueous solution containing both sodium nitrate and sodium nitrite.

4. The method according to claim 1, in which the refrigerated fluid is provided to the bottom of the storage tank.

5. The method according to claim 1, in which the portions of the stored fluid directed to the inlet air cooler are drawn from the bottom of the storage tank.

6. The method according to claim 1, in which the portions of the stored fluid directed to the inlet air cooler are drawn from the bottom of the storage tank, and fluid from the inlet air cooler is returned to the top of the storage tank.

7. An apparatus comprising:

a combustion turbine with an inlet air cooler;

a storage tank;

a refrigeration unit;

means for storing a fluid other than plain water in the storage tank, in thermally stratified storage;

means for periodically refrigerating portions of the fluid in the refrigeration unit and providing the refrigerated fluid to the storage tank at a temperature below 4.1° C. (39.4° F.); and means for directing portions of the stored fluid to the inlet air cooler.

8. The apparatus of claim 7, in which:

the means for providing the refrigerated fluid to the storage tank comprises a line from the refrigeration unit to the bottom of the storage tank;

the means for directing portions of the stored fluid to the inlet air cooler comprises a line from the bottom of the storage tank to the inlet air cooler; and the apparatus further comprises a fluid return line from the inlet air cooler to the top of the storage tank.

* * * * *